United States Patent
Lehew et al.

(10) Patent No.: US 7,940,686 B2
(45) Date of Patent: May 10, 2011

(54) NETWORK PERFORMANCE TUNER

(75) Inventors: Christian R. Lehew, Redmond, WA (US); Harry S. Pyle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/053,968

(22) Filed: Feb. 9, 2005

(65) Prior Publication Data

US 2006/0176827 A1    Aug. 10, 2006

(51) Int. Cl.
- *G01R 31/08* (2006.01)
- *H04B 3/46* (2006.01)
- *H04W 24/00* (2009.01)

(52) U.S. Cl. ........ 370/252; 370/232; 375/225; 375/228; 455/423

(58) Field of Classification Search .......... 370/232–234, 370/235, 252, 253; 375/224, 225, 228; 455/423
See application file for complete search history.

(56) References Cited

U.S. PATENT DOCUMENTS

| | | | | |
|---|---|---|---|---|
| 5,467,341 A * | 11/1995 | Matsukane et al. | ........... | 370/253 |
| 5,867,483 A * | 2/1999 | Ennis et al. | ........... | 370/252 |
| 6,011,868 A * | 1/2000 | van den Branden et al. | . | 382/233 |
| 6,233,226 B1 * | 5/2001 | Gringeri et al. | ........... | 370/252 |
| 6,285,660 B1 * | 9/2001 | Ronen | ........... | 370/259 |
| 6,538,656 B1 * | 3/2003 | Cheung et al. | ........... | 345/519 |
| 6,636,533 B1 * | 10/2003 | Baransky et al. | ........... | 370/542 |
| 6,735,553 B1 * | 5/2004 | Frogner et al. | ........... | 702/186 |
| 6,785,292 B1 * | 8/2004 | Vogel | ........... | 370/433 |
| 6,850,736 B2 * | 2/2005 | McCune, Jr. | ........... | 455/67.13 |
| 6,990,313 B1 * | 1/2006 | Yarkosky | ........... | 455/9 |
| 7,096,160 B2 * | 8/2006 | Skidmore et al. | ........... | 702/186 |
| 7,203,169 B1 * | 4/2007 | Okholm et al. | ........... | 370/232 |
| 7,305,464 B2 * | 12/2007 | Phillipi et al. | ........... | 709/223 |
| 2002/0009060 A1 * | 1/2002 | Gross | ........... | 370/321 |
| 2003/0012217 A1 * | 1/2003 | Andersson et al. | ........... | 370/437 |
| 2003/0028891 A1 * | 2/2003 | Hardt et al. | ........... | 725/107 |
| 2003/0055604 A1 * | 3/2003 | Skidmore et al. | ........... | 702/186 |
| 2004/0015755 A1 * | 1/2004 | Klotz et al. | ........... | 714/719 |
| 2004/0143428 A1 * | 7/2004 | Rappaport et al. | ........... | 703/22 |
| 2004/0148138 A1 * | 7/2004 | Garnett et al. | ........... | 702/189 |
| 2005/0015644 A1 * | 1/2005 | Chu et al. | ........... | 714/4 |
| 2006/0082444 A1 * | 4/2006 | Sweeney et al. | ........... | 340/10.3 |

* cited by examiner

*Primary Examiner* — Daniel J Ryman
*Assistant Examiner* — Thinh D Tran
(74) *Attorney, Agent, or Firm* — Lee & Hayes, PLLC

(57) ABSTRACT

Described herein are techniques to facilitate the improvement of network throughput. An implementation described herein measures throughput over a data-communications network and between at least two endpoints on the network. This implementation also displays a graphical representation depicting the present throughput of the network as it is measured. The graphical representation has an identified target throughput threshold, and that threshold is indicative of an acceptable level of throughput for the usage being targeted, such as high-quality video streaming.

15 Claims, 7 Drawing Sheets

NETWORK PERFORMANCE TUNER

TECHNICAL FIELD

This invention generally relates to a technology that facilitates tuning the performance of a data-communications network.

BACKGROUND

With the current state of available home wireless network technology, there are significant limitations to delivering a quality video experience. Customers often experience intermittent interference and less than optimal throughput over typical wireless networks. When not used for video, performance issues with wireless networks often go unnoticed, because non-video uses rarely push the limits of a wireless network's performance capabilities. For example, web pages continue to load and email is still sent via a network operating at less than full capacity. The fact that there may have been a short-term glitch, or that the maximum possible bandwidth is momentarily unavailable, causes only minor degradations in the experience.

Streaming high fidelity multimedia (e.g., video and audio) data over a typical home wireless network pushes existing affordable and widely available wireless home networking technologies to their limits. Because of this, even relatively minor transmission/reception issues result in effects that may be described as "glitchy," "jerky," "stop-and-start," and the like. Since these effects are easily noticed by the customers, multimedia electronics producers and data service providers strive to reduce the occurrence of glitches.

However, often there are many practical actions that a customer can take which will affect the overall performance of a wireless networking environment. For example, fine adjustments to and placement of wireless equipment can affect the overall performance. Unfortunately, the customer typically does not know what action can be taken to prevent or ameliorate performance issues in a glitch-prone wireless networking environment.

Conventionally, a customer does not know if there is a problem with network throughput. The customer does not know what network changes to make that may actually improve throughput. Furthermore, the customer is unable to actively monitor the network throughput in order to see the effects of making network changes.

SUMMARY

Described herein are techniques to facilitate the improvement of network throughput. An implementation described herein measures throughput over a data-communications network and between at least two endpoints on the network. This implementation also displays a graphical representation depicting the present throughput of the network as it is measured. The graphical representation has an identified target throughput threshold, and that threshold is indicative of an acceptable level of throughput for the usage being targeted, such as high-quality video streaming.

BRIEF DESCRIPTION OF THE DRAWINGS

The same numbers are used throughout the drawings to reference like elements and features.

DETAILED DESCRIPTION

The following description sets forth techniques that help a user tune the performance of a communications network to a desired level. For example, a user may tune the throughput of a wireless network so that it sustains a desired level of throughput for streaming multimedia data over the wireless network.

Exemplary Scenario

Figure 1:
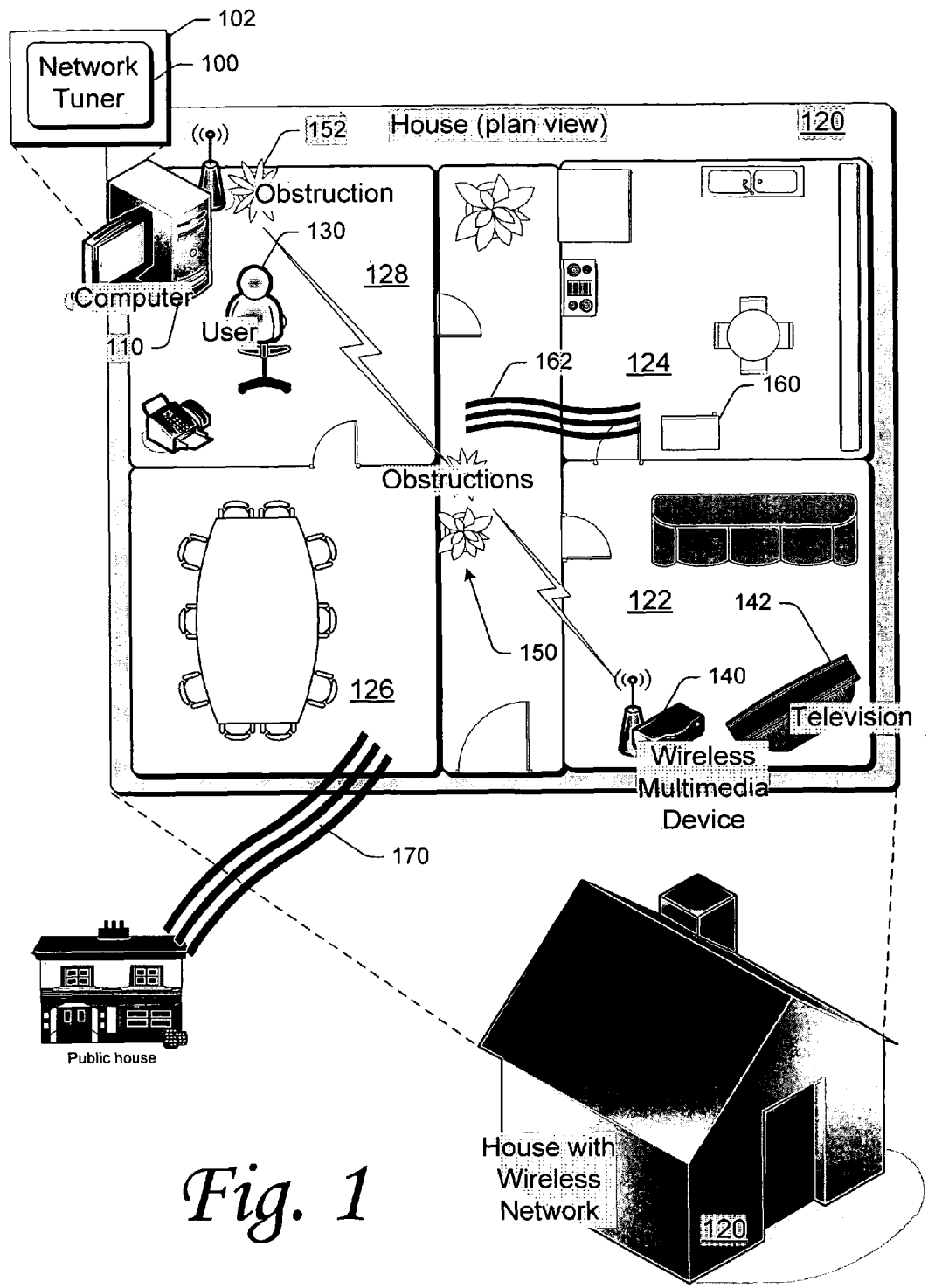
FIG. 1 shows an example of a typical wireless networking scenario within which one or more implementations described herein may operate.
Figure 7:
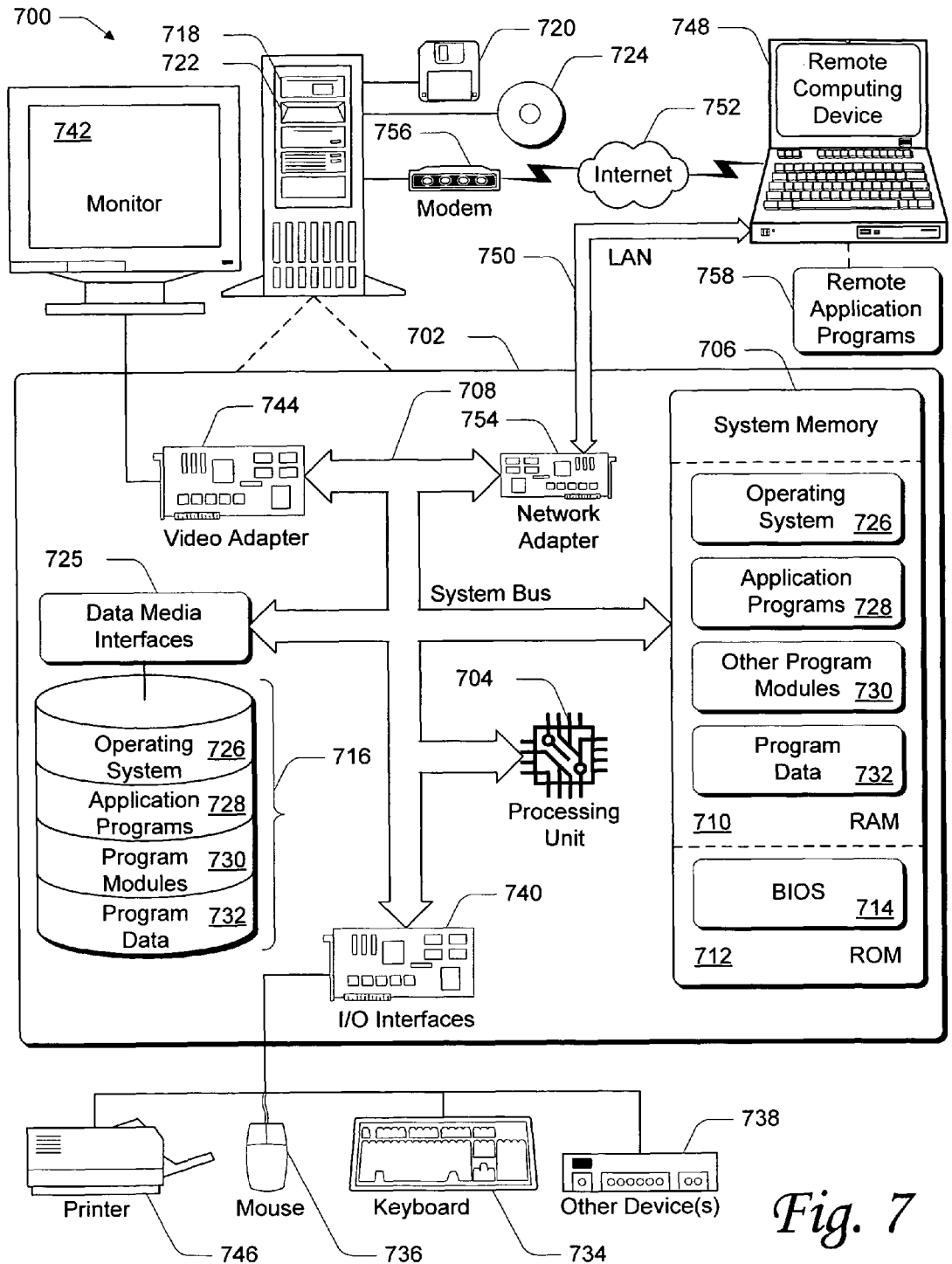
FIG. 7 is an example of a computing operating environment capable of (wholly or partially) implementing at least one embodiment described herein.

FIG. 1 illustrates, at a high-level, the environmental context of a network-performance tuner 100, as described herein, in an exemplary home wireless network scenario. The tuner 100 itself is, for example, a program module executing within a primary memory system 102 (e.g., volatile or non-volatile memory) of a computer 110. This computer may be a general- or special-purpose computer in this illustrated scenario. FIG. 7 depicts another computer system on which the tuner 100 may operate.

The computer 110 (or another network accessible computer) may be running an integrated multimedia software product, such as the Microsoft® Windows® XP Media Center™ Edition integrated multimedia & entertainment product. Using such an integrated multimedia product, a user may enjoy an integrated home entertainment experience that includes photos, music, television programming, videos, and the like.

The exemplary scenario depicted in FIG. 1 shows a house 120 with a typical wireless network. FIG. 1 also depicts a plan view of the same house. For the sake of simplicity and brevity, the house is shown with just four rooms: a living room 122, a kitchen 124, a dining room 126, and a study 128. While the house 120 depicted in FIG. 1 is small, those of ordinary skill in the art understand that the house (and thus the networking environment) may be substantially larger than the example shown in FIG. 1.

Isabel 130, the user in this scenario, purchases a new wireless multimedia set-top box 140 and brings it home (e.g., house 120) to install. Isabel connects the set-top box to her television (TV) 142 in her living room 122 of the house 120. An example of the set-top box 140 is the Microsoft® Windows® XP™ Media Center™ Extender set-top box.

The set-top box 140 takes advantage of her home wireless network to communicate with her integrated multimedia software product installed on her computer 110 in her study 128. Isabel 130 may gather the family in the living room 122 to watch her TV 142. After pressing a few buttons on her comfortable and familiar remote control, Isabel and her family enjoy experiencing the videos, television programming, music, and photos that are stored on her computer 110, which is located in a different room (e.g., her study 128) of the home.

After physically coupling the set-top box 140 and the TV 142, Isabel 130 typically completes the installation of the set-top box via the computer 110, which has the integrated multimedia software product installed thereon. At or near the completion of installation of the set-top box's software and configuration data at the computer 110, the network tuner 100 is executed in order to determine if current network performance could result in a less-than-ideal experience and if so, the tuner helps Isabel with fine tuning of the networking environment. Using the network-performance tuner 100, a user (such as Isabel 130) may adjust her networking environment to maximize network throughput of her home wireless network.

Streaming high fidelity multimedia (e.g., video and audio) data over a home network pushes commonly available and affordable home wireless networking technologies to their limits. High fidelity multimedia is streamed between the computer 110 and the set-top box 140. Consequently, the network-performance tuner 100 is packaged with the set-top box 140, so that Isabel has the opportunity to optimize her network's performance when the set-top box is first installed in her network. The tuner 100 helps Isabel 130 find any performance issues early and solve them quickly and avoid a frustrating customer service call. Addressing any network performance issues at installation time, when Isabel 130 is expecting to spend some time setting up, rather than later in the middle of a TV show, enhances Isabel's overall product experience.

Initially, the network tuner 100 performs a quick-test which provides an initial evaluation of the network throughput and, as its name implies, is performed relatively quickly (e.g., approximately thirty seconds or less). If the results of the quick-test are above a defined "quick-test threshold," then the tuner informs Isabel that her network's throughput is sufficient and that no further fine-tuning is necessary.

The quick-test employs any available (e.g., conventional or new) techniques for measurement of bandwidth over a data communications network (e.g., a wireless network), which provides an initial evaluation of network bandwidth when performed for thirty seconds or less. During the quick-test, the network tuner 100 may, for example, mathematically integrate test samples to simulate receive-end buffer starvation and check to see if it falls below a threshold (e.g., the quick-test threshold). If during the quick-test, the tuner 100 determines that the receive-end buffer would have starved, the tuner aborts the test early and indicate that tuning is needed. In at least one implementation, the quick-test may be called a "buffer starvation analysis."

The quick-test threshold may be defined as a heuristically or manually determined throughput level that is regarded as sufficient to deliver high-fidelity multimedia (or other desired data for transmission). For example, eight Mbits/sec may be regarded as sufficient for streaming conventional common multimedia (which typically streams at about 6-7 Mbits/sec). In another example, twenty-two Mbits/sec may be regarded as sufficient for streaming HDTV-level multimedia (which typically streams at about 18 Mbits/sec). Furthermore, to avoid the possibilities of glitches, the network should sustain a measured throughput above the threshold throughout the entirety of the test or for a defined time period.

A key objective of the quick-test is to avoid exposure of unnecessary complexity to those users who have a network with more than sufficient bandwidth (e.g., a fully wired network). If a quick test of the network bandwidth indicates that it is more than sufficient, the tuner informs Isabel 130, and the setup of the set-top box finishes.

If the quick-test indicates that the bandwidth is marginal or clearly insufficient, then the tuner 100 directs Isabel 130 through a more complex procedure, which helps Isabel take action that may improve network throughput. The tuner 100 presents a user-interface (UI) to Isabel 130 that informs her that she could potentially have problems using high-fidelity multimedia with the set-top box 140.

In order to get a good experience, users frequently need to take additional actions to adjust the networking environment. The users may need to reduce obstructions in the wireless path between components and/or make fine adjustments to the wireless equipment to maximize their network throughput.

The UI suggests that Isabel perform a more thorough network throughput test and, during that test, Isabel may adjust her network environment in an attempt to improve the network's bandwidth. For this more thorough network throughput test, the tuner 100 measures network performance and provides a user-feedback mechanism regarding network performance. The tuner presents a UI with a continually running graph, indicating the present and recent throughput of the network.

The thorough network throughput test employs any available (e.g., conventional or new) techniques for measurement of bandwidth over a data communications network (e.g., a wireless network), which provides a relatively accurate measurement of the bandwidth.

The thorough network throughput test runs as long as the user desires. During that thorough network throughput test, the network tuner 100 utilizes a low-pass filter on the test samples for a graphical presentation that approximates receive-end buffer fullness. In at least one implementation, the thorough network throughput test may be called a "buffer fullness simulation."

During this thorough and continually running bandwidth measurement test, the tuner 100 measures network bandwidth between two endpoints (e.g., the computer 110 and the set-top box 140) without regard to what type of network components exist between the endpoints and without regard to which endpoint, if any, is connected wirelessly. This allows for detection of bandwidth-impeding problems, even on completely wired networks or networks using equipment from many different manufacturers.

Figure 2:
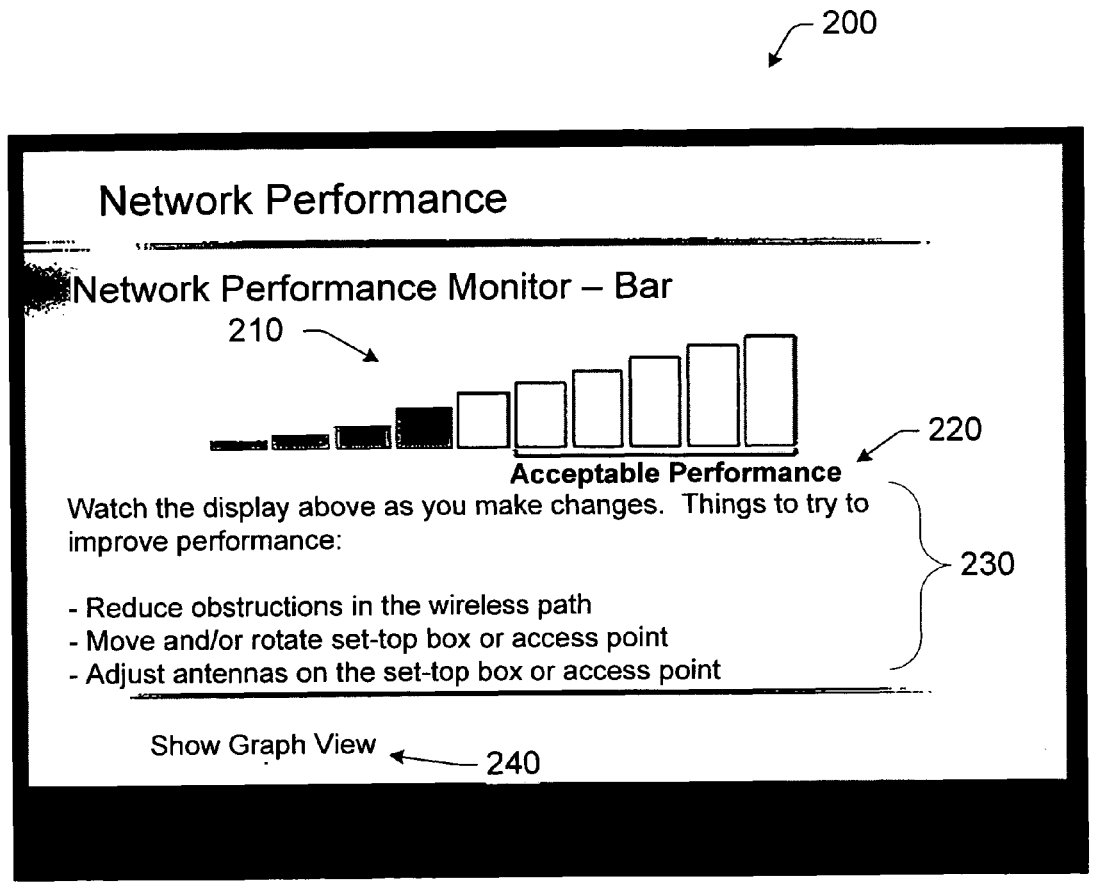
FIGS. 2, 3, and 4 illustrate an example of a user-interface in accordance with at least one implementation described herein.
Figure 3:
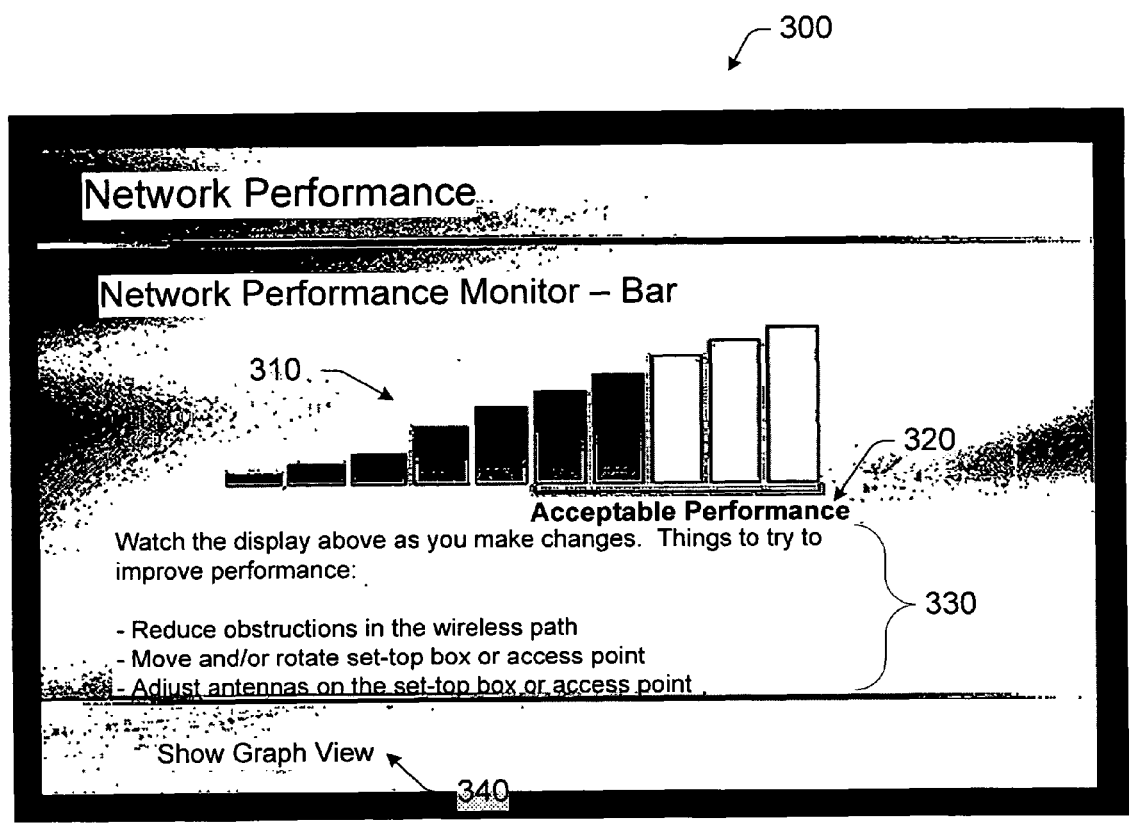

FIGS. 2 and 3 illustrate examples of UIs (specifically UI 200 of FIG. 2 and UI 300 of FIG. 3) that the tuner may employ. These example UIs offer a simplified view to limit end-user confusion. These UIs provide the user feedback.

As Isabel 130 takes actions, with the intent of improving network bandwidth, she sees the results of her actions in real-time on the graphical UI such as those of FIGS. 2 and 3. By actively monitoring the throughput via the graphical UI display of the tuner 100, Isabel can determine how her actions affect the network throughput.

The UIs 200 and 300 clearly communicate a target level or range that is "acceptable." At that target level, the network throughput is sufficient to support a specified purpose, such as streaming glitch-free high-fidelity multimedia data. Each specified purpose may have a pre-defined, heuristically determined, or a calculated acceptable level.

In the realm of high-fidelity multimedia data transmissions, the "acceptable" target level or range may be defined as the throughput level that is sufficient to deliver high-fidelity multimedia data. As mentioned earlier in discussion of the quick-test, eight Mbits/sec is regarded as sufficient for streaming typical multimedia, and twenty-two Mbits/sec is regarded as sufficient for streaming HDTV-level multimedia. Furthermore, to avoid the possibilities of glitches, the measured throughput should be sustainable within the "acceptable" target range.

For example, Isabel may view a bar-graph monitor 210 of the UI 200. The dark bars indicate a relative measure of network throughput. Area 220 is labeled "Acceptable Performance" to indicate that the network throughput will be acceptable for the desired purpose (e.g., streaming multimedia). The "Acceptable Performance" range is reached when one or more of these bars are darkened.

In this example, assume that Isabel takes action to improve bandwidth. As a result, Isabel may see bar-graph monitor 310 of UI 300. The dark bars are now in the area 320 labeled "Acceptable Performance." Consequently, Isabel knows that her efforts have improved network performance.

Furthermore, the network-performance tuner 100 may employ an audio UI throughput indicator. An audio signal may indicate a relative degree of throughput. That way, a user may "hear" the available bandwidth from another room when the user is unable to see the screen displaying the bars or the graph. For example if a user was making very minor tweaks to the position of their wireless networking components antennas they might be doing so in a completely isolated room of the house. In this case instead of making very minor tweaks over-and-over then running back to the display to see how the last modification affected performance if they could just turn the volume up loud on the device that was running the performance tuner then ideally it would make a different sound when they were in the "acceptable" range then when they were in the "unacceptable" range and they'd easily be able to distinguish this allowing them to stay in one room and make the tweaks continually only stopping when the sound indicated they were successful.

Figure 4:
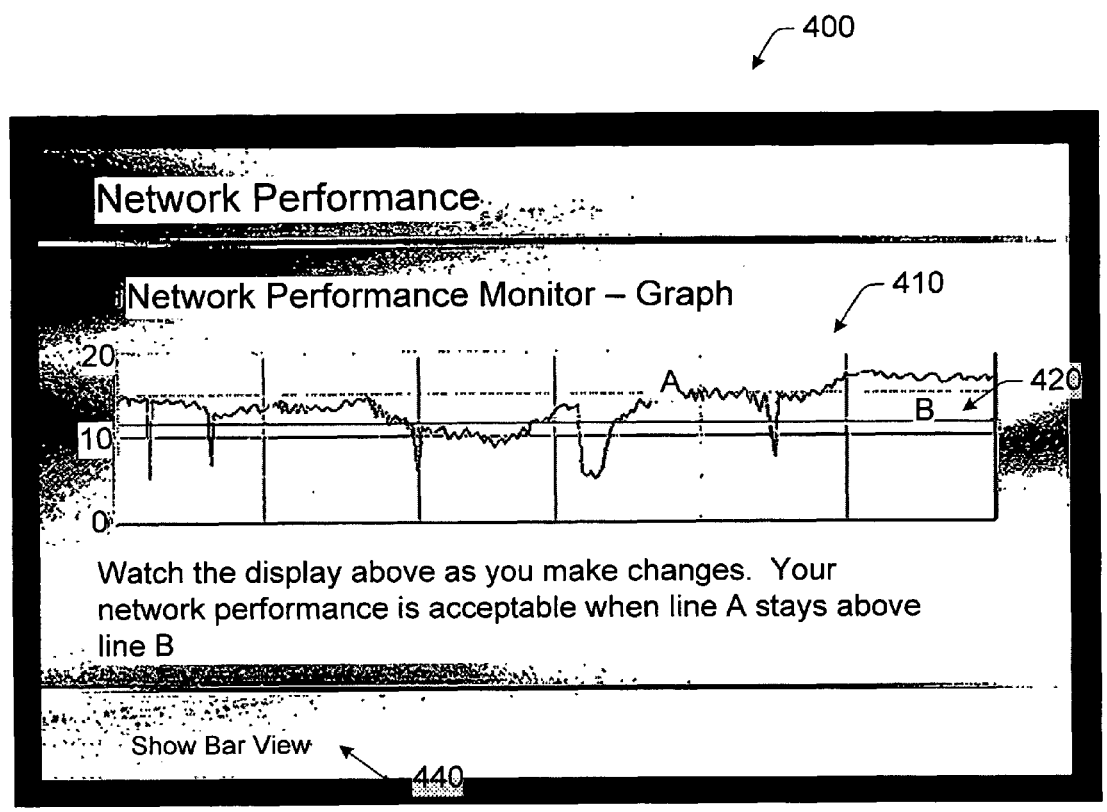

FIG. 4 illustrates a UI 400, which is an example of another view of the network throughput. The UI 400 is an example of an easily accessible, detailed view showing valuable historical throughput information as a line graph. This UI also has an "acceptable performance" target line, which is shown at 420 in UI 400.

FIGS. 2 and 3 show a clickable button (240 in FIG. 2 and 340 in FIG. 3) that allows for easy access to the detailed view of UI 400. Similarly, FIG. 4 shows a clickable button 440 that allows for easy access to the simplified summary view of UIs 200 and 300.

Via a link to one or more websites (on the Internet), the tuner 100 may list the detailed and in-depth suggestions and tips for performance-improving actions. These detailed and in-depth suggestions may be discovered through product support channels. Alternatively, the tuner may present a list or a document with static and/or dynamically generated data. The data details suggestions for actions that Isabel can administer to improve the performance of the network.

Examples of suggested performance-improving actions are shown at 230 in UI 200 and 330 in UI 300. Other examples include (by way of example only and not limitation) the following:

Move one or more wireless access points (WAPs). Moving the WAP just six inches can make an appreciable difference. If possible, it may be helpful to move a WAP to a different room.

Move the set-top box 140. Again, just a small movement of 6-12 inches may make a noticeable difference.

Reorient antenna on the one or more WAPs.

Reorient antenna on the set-top box 140.

Change network topology. For example, modifying the components and/or fundamental structure of the network changes the network topology.

Switch to a different wireless network band if possible. For example, a suggestion to change from the popular and inexpensive Wireless-B (IEEE 802.11b) equipment to the newer and, almost five times faster, Wireless-G (IEEE 802.11g) equipment.

Change to a different channel within the band. Each wireless network band offers multiple channels. Some may perform better than others.

Move obstructions in the path. FIG. 1 shows several obstructions (150 and 152) in the signal path of the home's wireless network. In particular, the depicted obstructions 150 and 152 are houseplants.

Adjust interfering items. FIG. 1 shows several microwave oven 160 producing interference waves 162 in the signal path of the home's wireless network. In addition, FIG. 1 shows that a neighbor's wireless network is producing interference 170.

After Isabel follows one or more of the suggestions, she watches the tuner's UI to see how her actions affect the current bandwidth measurement. Hopefully, Isabel discovers one or more suggested actions that successfully raise the bandwidth to an acceptable and sustainable level.

Once the network throughput reaches a sustainable and acceptable level, Isabel terminates the tuner 100. With the set-top box 140 in this well-tuned wireless network, Isabel and her family watch the TV 142 in the living room 122 and enjoy the great video from the computer 110, which is located in the study 128.

As described above, the tuner 100 is integrated with the installation process of the set-top box 140. Of course, in other implementations, the tuner 100 may be available as a standalone utility and may operate separately from the set-top box installation process. Since conditions change in the networking environment (which includes the physical environment in which the network operates), the throughput of the network may change. At any time, Isabel may run the tuner as a standalone utility to help improve network performance.

While the discussions herein focus on wireless networks, those of ordinary skill in the art understand and appreciate that the data-communications networks environment is not limited to wireless networks. It is also not limited to a home-networking environment. Therefore, unless the context indicates otherwise, the techniques described herein operate within and on any data-communications network having a bandwidth or throughput, which is capable of being measured.

Exemplary Network-Performance Tuner

Figure 5:
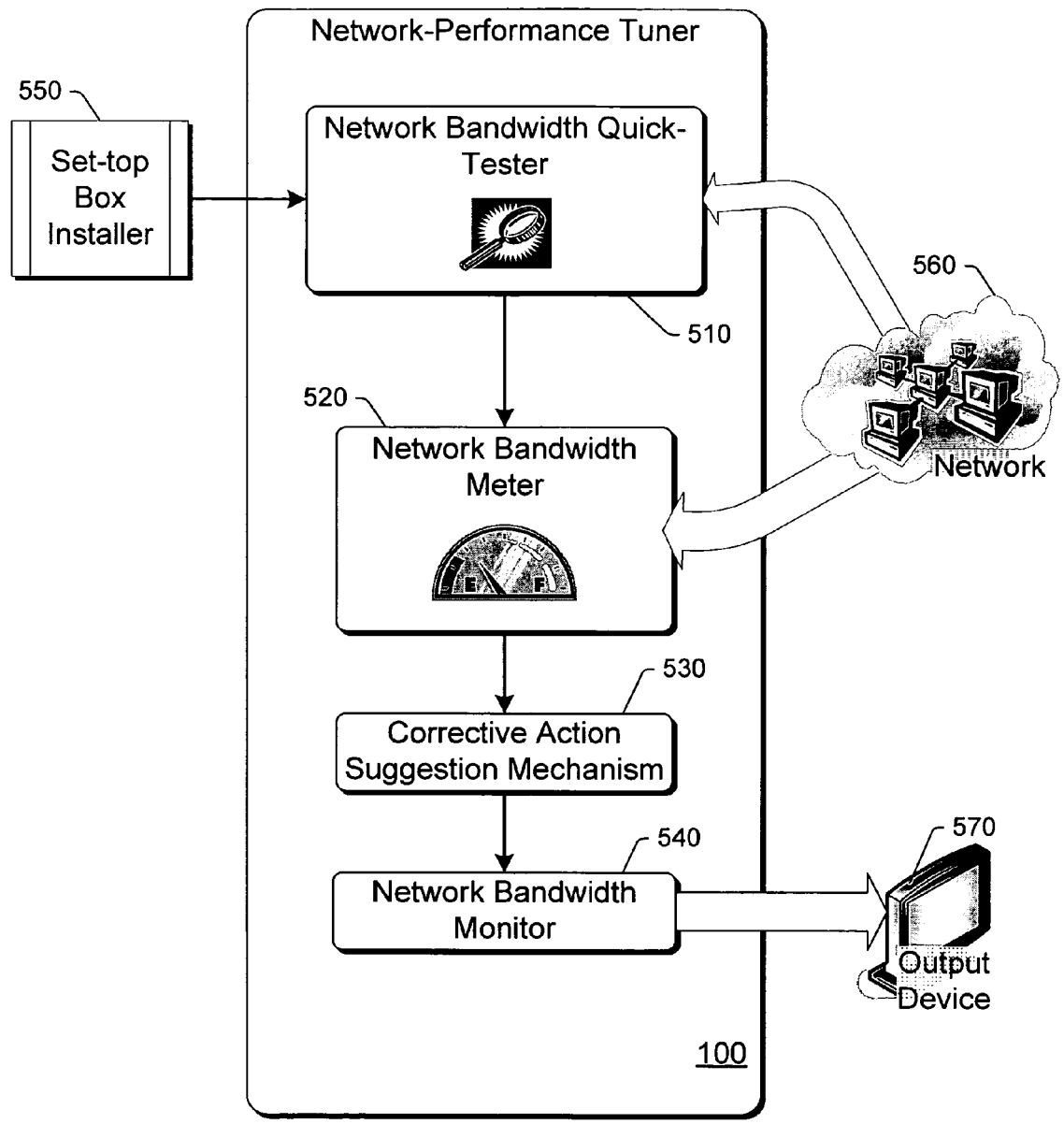
FIG. 5 shows operational components of an exemplary network-performance tuner in accordance with at least one implementation described herein.

FIG. 5 illustrates operational details of the network-performance tuner 100. Because this is the same tuner 100 discussed and referenced in FIG. 1, the tuner shown in FIG. 5 retains the 100 reference designation. Although the operational components of FIG. 5 are shown as being part of the tuner 100, those of ordinary skill in the art understand that each operational component and sub-component may be incorporated into one or more entities other than the tuner.

As shown in FIG. 5, the components of the network-performance tuner 100 include a network-bandwidth quick-tester 510, a network-bandwidth meter 520, a corrective action suggestion mechanism 530, and a network-bandwidth monitor 540.

After a set-top box installer 550 has completed (or nearly completed) installation of configuration data and software for the set-top box, the network-bandwidth quick-tester 510 of the tuner 100 takes over. In a short time (e.g., 20-30 seconds), the quick-tester performs a quick evaluation of the bandwidth of a subject network 560 between the tuner and the set-top box.

If that quick evaluation indicates that the network's bandwidth is more than sufficient, then the tuner 100 skips the remaining functional components illustrated in FIG. 5. If the evaluated bandwidth is not clearly sufficient, then the network-bandwidth meter 520 begins to perform a more thorough measurement of the network 560 bandwidth. Until terminated, the meter continues to measure bandwidth.

A corrective action suggestion mechanism 530 acquires a static document that lists some suggested actions that the user may take to improve network throughput. This static document may be stored on a same computer-readable medium, which is the source of the tuner's installation software. Instead, the suggestion mechanism may acquire the static document from any accessible source (e.g., via the Internet) or it may provide a link to an updatable document located on any accessible source (e.g., via the Internet). Alternatively, the suggestion mechanism 530 may dynamically generate a list of suggested actions from one or more sources (including, for example, websites on the Internet).

In the realm of personal computers, an implementation may employ a software user-interface tool to interrogate a user. That tools may be called a "wizard." This wizard may ask the user questions about things that could affect network performance in an effort to narrow down the list of possible corrective action suggestions. Indeed, the information produced by the wizard aids or directs the suggestion mechanism 530 when it dynamically generates a list of suggested actions from one or more sources For example, the wizard might up-front ask the user if they have an 802.11g or 802.11a wireless network. Based upon the user's responses, the suggestion mechanism 530 knows that some suggestions apply and other do not apply.

Furthermore, there may be additional detection software or mechanism that automatically discovers information, properties, and characteristics about the network (without interrogating a user). The suggestion mechanism 530 tailors its suggestions based, at least in part, on the automatically discovered information, properties, and characteristics about the network. For example, detection software may detect that a user is running on an 802.11g network and that the wireless networking "channel" chosen is conflicting with a nearby wireless network. In such an instance, the suggestion mechanism 530 gives the user a very pointed suggestion about changing their wireless networking channel to another channel where no interference is detected.

Based upon the list provided by the suggestion mechanism 530 and the present network-bandwidth as measured by the meter 520, the network-bandwidth monitor 540 generates one or more user-interfaces (UIs) on an output device 570 (e.g., a computer monitor). The generated UI presents the list provided by the suggestion mechanism 530 and graphically represents the network-bandwidth as measured by the meter 520. Examples of UIs that may be presented by the network-bandwidth monitor 540 include UIs 200, 300, and 400 as shown in FIGS. 2-4.

Methodological Implementation

Figure 6:
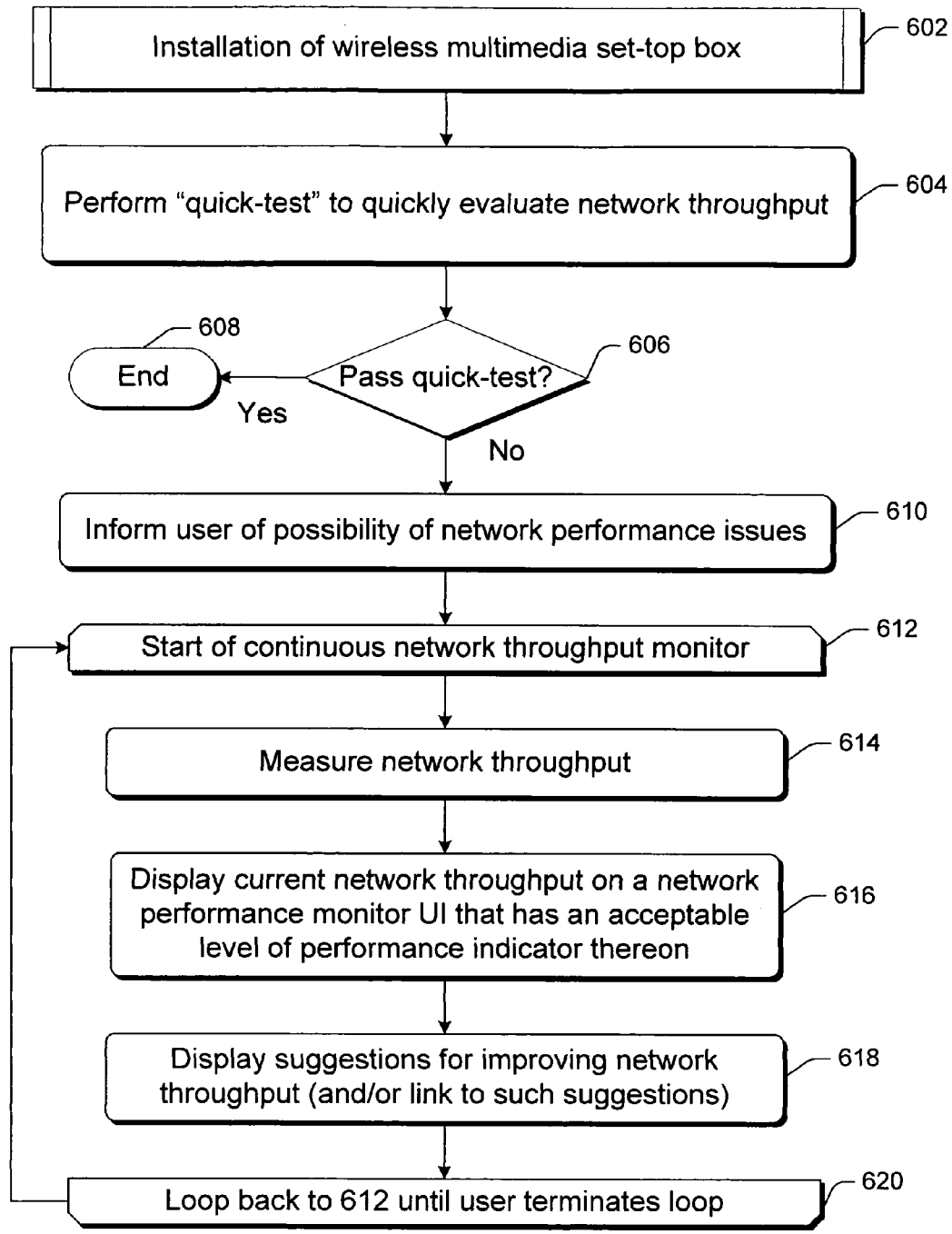
FIG. 6 illustrates a flow diagram showing a methodological implementation described herein.

FIG. 6 shows a method 600 performed by the network-performance tuner 100. This methodological implementation may be performed in software, hardware, or a combination thereof. For ease of understanding, the method is delineated as separate steps represented as independent blocks in FIG. 6; however, these separately delineated steps should not be construed as necessarily order dependent in their performance. Additionally, for discussion purposes, the method 600 is described with reference to FIG. 1.

At 602 of FIG. 6, the computer 110 completes installation of the wireless multimedia set-top box 140. When the network-performance tuner 100 is functioning standalone, block 602 is skipped.

At 604, the tuner 100 performs a quick-test to rapidly evaluate network throughput of a subject network.

If, at 606, the tuner 100 determines that the network throughput is clearly sufficient to support heavy data transmission loads, then it terminates the method 600 at 606. Otherwise, the method proceeds to the next block, which is 610. At 610, the tuner 100 informs the user of the possibility of network performance issues.

Blocks 612-At 620 form a loop that the tuner 100 performs until the user terminates the loop or some other trigger event (e.g., a timeout) occurs.

At 614, the tuner measures network throughput.

At 616, the tuner displays the present network throughput via a network performance monitor UI. That UI also displays an indication of the level of throughput necessary to be considered an acceptable level for the desired purpose. For example, the desired purpose may be transmission of HDTV quality multimedia over a wireless network. Each desired purpose may have a pre-defined or a calculated acceptable level.

Of course, the network throughput measurement of block 614 and the display of that throughput via a UI of block 616 may occur concurrently.

At 618, the tuner displays a list of suggestions for improving network throughput (and/or a link to such suggestions found on a website on the Internet).

At 620, the process loops back to block 612. The looping continues until the user terminates the loop or some other trigger (e.g., timeout) occurs.

Exemplary Computing System and Environment

FIG. 7 illustrates an example of a suitable computing environment 700 within which an exemplary network-performance tuner, such as tuner 100 as described herein, may be implemented (either fully or partially). The computing environment 700 may be utilized in the computer and network architectures described herein.

The exemplary computing environment 700 is only one example of a computing environment and is not intended to suggest any limitation as to the scope of use or functionality of the computer and network architectures. Neither should the computing environment 700 be interpreted as having any dependency or requirement relating to any one or combination of components illustrated in the exemplary computing environment 700.

The exemplary network-performance tuner may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary network-performance tuner may be described in the general context of computer-executable instructions, such as program modules, being executed by a computer. Generally, program modules include routines, programs, objects, components, data structures, etc. that perform particular tasks or implement particular abstract data types. The exemplary network-performance tuner may also be practiced in distributed computing environments where tasks are performed by remote processing devices that are linked through a data-communications network. In a distributed computing environment, program modules may be located in both local and remote computer storage media including memory storage devices.

The computing environment 700 includes a general-purpose computing device in the form of a computer 702. The components of computer 702 may include, but are not limited to, one or more processors or processing units 704, a system memory 706, and a system bus 708 that couples various system components, including the processor 704, to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 702 typically includes a variety of computer-readable media. Such media may be any available media that is accessible by computer 702 and includes both volatile and non-volatile media, removable and non-removable media.

The system memory 706 includes computer-readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 725. Alternatively, the hard disk drive 716, magnetic disk drive 718, and optical disk drive 722 may be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 716, magnetic disk 720, optical disk 724, ROM 712, and/or RAM 710, including, by way of example, an operating system 726, one or more application programs 728, other program modules 730, and program data 732.

A user may enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device may also be connected to the system bus 708 via an interface, such as a video adapter 744. In addition to the monitor 742, other output peripheral devices may include components, such as speakers (not shown) and a printer 746, which may be connected to computer 702 via the input/output interfaces 740.

Computer 702 may operate in a networked environment using logical connections to one or more remote computers, such as a remote computing device 748. By way of example, the remote computing device 748 may be a personal computer, a portable computer, a server, a router, a network computer, a peer device or other common network node, and the like. The remote computing device 748 is illustrated as a portable computer that may include many or all of the elements and features described herein, relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. Such networking environments may be wired or wireless.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which may be internal or external to computer 702, may be connected to the system bus 708 via the input/output interfaces 740 or other appropriate mechanisms. It is to be appreciated that the illustrated network connections are exemplary and that other means of establishing communication link(s) between the computers 702 and 748 may be employed.

In a networked environment, such as that illustrated with computing environment 700, program modules depicted, relative to the computer 702 or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computing device 702, and are executed by the data processor(s) of the computer.

Computer-Executable Instructions

An implementation of an exemplary network-performance tuner may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 7 illustrates an example of a suitable operating environment 700 in which an exemplary network-performance tuner may be implemented. Specifically, the exemplary network-performance tuner(s) described herein may be implemented (wholly or in part) by any program modules 728-730 and/or operating system 726 in FIG. 7 or a portion thereof.

The operating environment is only an example of a suitable operating environment and is not intended to suggest any limitation as to the scope or use of functionality of the exemplary network-performance tuner(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Computer-Readable Media

An implementation of an Error! Reference source not found. may be stored on or transmitted across some form of computer-readable media. Computer-readable media may be any available media that may be accessed by a computer. By way of example, computer-readable media may comprise, but is not limited to, "computer storage media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Conclusion

The techniques, described herein, may be implemented in many ways, including (but not limited to) program modules, general- and special-purpose computing systems, network servers and equipment, dedicated electronics and hardware, and as part of one or more computer networks. The techniques may, for example, be implemented on a computer system depicted in FIG. 7.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method facilitating improvements in throughput of a data-communications network, the method comprising:
    measuring, at a computer executing a network tuner, the throughput over the data-communications network and between at least two endpoints on the data-communications network;
    displaying, at an output device associated with the computer, a user interface tool to gather information affecting performance of the data-communications network;
    automatically discovering properties and characteristics of the data-communications network by operation of software;
    suggesting corrective actions for application to the data-communications network, the suggesting performed by display, at the output device, of a dynamically generated list of suggested actions, the dynamically generated list based in part on direction from the user interface tool and the discovered properties and characteristics, the dynamically generated list comprising instructions for:
        moving a wireless access point;
        reorienting an antenna; or
        moving an obstruction;
    displaying a graphical representation at the output device, the graphical representation depicting a present throughput of the data-communications network, the graphical representation having an identified target throughput threshold, the identified target throughput threshold being indicative of an acceptable level of the throughput for the data-communications network;
    providing an audio signal having a first sound when the throughput is above the identified target throughput threshold and a second sound when the throughput is below the identified target throughput threshold, the first and second sounds audible while adjustments are made to an environment within which the data-communications network operates according to the suggested corrective actions, the audio signal switching between the first and second sounds in response to changes in the throughput resulting from the adjustments to the environment; and
    determining whether the throughput of the data-communications network exceeds the identified target throughput threshold for a specified period of time.

2. A method as recited in claim 1, wherein the data-communications network comprises a wireless network.

3. A method as recited in claim 1, wherein the data-communications network comprises a local wireless network located in a building.

4. A method as recited in claim 1, wherein the identified target throughput threshold is part of an identified target throughput range.

5. A method as recited in claim 1, wherein the acceptable level of throughput for the data-communications network is based upon transmission of high fidelity multimedia data over the data-communications network.

6. A method as recited in claim 1 further comprising installing software and setting configuration data for a network-coupled multimedia set-top, the network-coupled multimedia set-top being one of the at least two endpoints, wherein the measuring occurs while installing the software and setting the configuration data for the network-coupled multimedia set-top.

7. A method as recited in claim 1 further comprising providing a link to a network accessible document which lists suggested actions that the user may take to improve the throughput of the data-communications network.

8. A method as recited in claim 1 further comprising displaying an additional graphical representation at the output device, the additional graphical representation depicting the throughput of the data-communications network over time as the throughput is measured, and the additional graphical representation having the identified target throughput threshold, the identified target throughput threshold being indicative of the acceptable level of the throughput for the data-communications network.

9. A method as recited in claim 1, wherein the graphical representation depicting the measured throughput of the data-communications network is a bar graph.

10. A method facilitating improvements in bandwidth of a data-communications network, the method comprising:
  performing, at a computer executing a network tuner, a quick-test bandwidth measurement of the bandwidth over the data-communications network and between at least two endpoints on the data-communications network, the quick-test bandwidth measurement being an evaluation of the bandwidth over the data-communications network and between the at least two endpoints, the performing occurring over a defined time-period, the quick-test bandwidth measurement comprising mathematically integrating test samples to simulate receive-end buffer starvation, and if a determination is made that the receive-end buffer would have starved, aborting the quick-test bandwidth measurement and indicating that tuning is needed;
  determining whether the quick-test bandwidth measurement exceeds a defined quick-test threshold at the computer; and
  if the quick-test bandwidth measurement falls below the defined quick-test threshold, then performing operations comprising:
    measuring, at the computer, the bandwidth over the data-communications network and between the at least two endpoints on the data-communications network, the measuring occurring over an indefinite time-period;
    utilizing a low-pass filter on the test samples to create a graphical presentation that approximates receive-end buffer fullness;
    displaying, at an output device associated with the computer, a user interface tool to gather information affecting performance of the data-communications network;
    automatically discovering properties and characteristics of the data-communications network by operation of software;
    suggesting corrective actions for application to the data-communications network, the suggesting performed by display at the output device of a dynamically generated list of suggested actions, the dynamically generated list based in part on direction from the user interface tool and the discovered properties and characteristics, the dynamically generated list comprising instructions for:
      moving a wireless access point;
      reorienting an antenna; and
      moving an obstruction;
    displaying the graphical representation at the output device, the graphical representation depicting the bandwidth of the data-communications network as the bandwidth is measured, the graphical representation having an identified target bandwidth range, the identified target bandwidth range being indicative of an acceptable level of the bandwidth for the data-communications network; and
    providing an audio signal having a first sound when the bandwidth of the data-communications network is above the quick-test threshold and a second sound when the bandwidth is below the quick-test threshold, the first and second sounds audible while adjustments are made to an environment within which the data-communications network operates according to the suggested corrective actions, the audio signal switching between the first and second sounds in response to changes in the bandwidth resulting from the adjustments to the environment.

11. A method as recited in claim 10, wherein the defined quick-test threshold and the acceptable level of the bandwidth for the data-communications network are based upon one of a plurality of multimedia types provided by the data-communications network.

12. A method as recited in claim 10 further comprising installing software and setting configuration data for a network-coupled multimedia set-top, the network-coupled multimedia set-top being one of the at least two endpoints.

13. A method as recited in claim 10 further comprising providing a link to a network accessible document which lists suggested actions that a user may take to improve the bandwidth of the data-communications network.

14. A method as recited in claim 10 further comprising displaying an additional graphical representation at the output device, the additional graphical representation depicting the bandwidth of the data-communications network over time as the bandwidth is measured, the additional graphical representation having the identified target bandwidth range, the identified target bandwidth range being indicative of an acceptable level of the bandwidth for the data-communications network.

15. One or more computer-readable memory storage devices having computer-executable instructions stored thereon that, when read from the computer-readable memory storage devices and executed by a computer, cause the computer to perform operations comprising:
  measuring bandwidth over a data-communications network and between at least two endpoints on the data-communications network, the measuring occurring over a user-specified time-period;
  displaying a user interface tool to gather information submitted by the user affecting performance of the data-communications network;
  automatically discovering properties and characteristics of the data-communications network by operation of software;
  presenting a dynamically generated list of suggested corrective actions, the dynamically generated list based on the information submitted by the user and received through the user interface tool and based on the properties and characteristics of the data-communications network that were discovered, the suggested corrective actions comprising instructions for:
    moving a wireless access point;
    changing network topology;
    reorienting an antenna;
    moving an obstruction; and
    moving interfering items;
  displaying a graphical representation depicting a present bandwidth of the data-communications network as the bandwidth is measured, the graphical representation having an identified target bandwidth threshold, the threshold being indicative of an acceptable level of the bandwidth for the data-communications network; and
  providing an audio signal having a first sound when the bandwidth is above the identified target bandwidth threshold and a second sound when the bandwidth is below the identified target bandwidth threshold, the first and second sounds audible while adjustments are made to an environment within which the data-communications network operates according to the suggested corrective actions, the audio signal switches between the first and second sounds in response to changes in bandwidth resulting from the adjustments to the environment.

* * * * *